(12) United States Patent
Lecomte et al.

(10) Patent No.: US 10,507,540 B2
(45) Date of Patent: Dec. 17, 2019

(54) TOOL FOR MACHINING WELLS IN MULTI-STAGE DISCS BY PECM, ELECTROCHEMICAL MACHINING ASSEMBLY AND MACHINE INCLUDING SAID TOOL, AND METHOD USING SAID TOOL

(71) Applicants: SAFRAN AIRCRAFT ENGINES, Paris (FR); PEMTEC, Forbach (DE)

(72) Inventors: Janvier Lecomte, Moissy-cramayel (FR); Mickael Rancic, Moissy-cramayel (FR); Sophie Tallon, Moissy-cramayel (FR); Juri Kraft, Differten (DE); Andreas Grutzmacher, Saarlouis Picard (DE)

(73) Assignees: SAFRAN AIRCRAFT ENGINES, Paris (FR); PEMTEC, Forbach (DE)

( * ) Notice: Subject to any disclaimer, the term of this patent is extended or adjusted under 35 U.S.C. 154(b) by 81 days.

(21) Appl. No.: 15/766,533

(22) PCT Filed: Oct. 7, 2016

(86) PCT No.: PCT/FR2016/052600
§ 371 (c)(1),
(2) Date: Apr. 6, 2018

(87) PCT Pub. No.: WO2017/060651
PCT Pub. Date: Apr. 13, 2017

(65) Prior Publication Data
US 2019/0054555 A1 Feb. 21, 2019

(30) Foreign Application Priority Data
Oct. 7, 2015 (FR) ...................................... 15 59541

(51) Int. Cl.
*B23H 7/26* (2006.01)
*B23H 3/04* (2006.01)
(Continued)

(52) U.S. Cl.
CPC ................. *B23H 7/26* (2013.01); *B23H 3/04* (2013.01); *B23H 3/10* (2013.01); *B23H 9/10* (2013.01)

(58) Field of Classification Search
CPC ............... B23H 7/26; B23H 3/04; B23H 9/10
See application file for complete search history.

(56) References Cited

U.S. PATENT DOCUMENTS

| 3,288,699 A | 11/1966 | Trager et al. |
| 8,057,645 B2 | 11/2011 | McGee et al. |

(Continued)

FOREIGN PATENT DOCUMENTS

| CN | 101524805 A | 9/2009 |
| CN | 102873417 A | 1/2013 |

(Continued)

OTHER PUBLICATIONS

English translation of International Search Report dated Jan. 5, 2017, in International Application No. PCT/FR2015/052800 (2 pages).

(Continued)

*Primary Examiner* — Nicholas A Smith
(74) *Attorney, Agent, or Firm* — Bookoff McAndrews, PLLC

(57) ABSTRACT

Tooling (10) for making slots in a multistage disk (1) by electrochemical machining. The tooling comprises first and second rings (20) arranged coaxially about a disk axis and configured to act as cathodes, each ring having an inside periphery with a plurality of radial machining projections. The first and second rings (20) are rigidly secured relative to (Continued)

each other. A method of making slots in a multistage disk by electrochemical machining using such a tool.

10 Claims, 3 Drawing Sheets

(51) Int. Cl.
*B23H 9/10* (2006.01)
*B23H 3/10* (2006.01)

(56) References Cited

U.S. PATENT DOCUMENTS

2006/0272957 A1\* 12/2006 Lamphere ................ B23H 9/10
205/641
2012/0213639 A1 8/2012 Noble et al.

FOREIGN PATENT DOCUMENTS

CN 103862120 A 6/2014
FR 3 006 925 A1 12/2014

OTHER PUBLICATIONS

Office Action in corresponding Chinese Patent Application No. 201680065686X dated May 17, 2019, (9 pages).

\* cited by examiner

TOOL FOR MACHINING WELLS IN MULTI-STAGE DISCS BY PECM, ELECTROCHEMICAL MACHINING ASSEMBLY AND MACHINE INCLUDING SAID TOOL, AND METHOD USING SAID TOOL

CROSS-REFERENCE TO RELATED APPLICATION(S)

This patent application is a U.S. national phase entry under 35 U.S.C. § 371 of International Application No. PCT/FR2016/052600, filed Oct. 7, 2016, which claims benefit under 35 U.S.C. § 119 to French Application No. 1559541, filed Oct. 7, 2015, the entireties of each of which are incorporated herein by reference.

FIELD OF THE INVENTION

The present invention relates to tooling for making slots in a multistage disk by electrochemical machining, to an assembly and to a machine including such tooling, and to a method using such tooling.

STATE OF THE PRIOR ART

Multistage disks are generally machined by broaching or by milling followed by filleting (edge rounding) for the largest diameter stage, and by milling followed by filleting (without broaching) for machining the smallest diameter stage. For each stage, a plurality of machining operations are necessary, and in particular a deburring operation is necessary after each broaching or milling operation. Those technical solutions have the drawback of presenting considerable operating costs and long fabrication times, and also a risk of milling tools breaking.

Another known technique, serving to mitigate those drawbacks, consists in pulsed electrochemical machining (PECM). Document FR 3 006 925 describes a device and a method using that technical solution for making slots in a single-stage part.

SUMMARY OF THE INVENTION

Thus, the objective of the invention is to remedy the drawbacks of the prior methods and to make it possible to machine the various stages of a multistage disk in a manner that is relatively simple, in a time that is relatively short, and while using tooling and a machine of cost that is moderate.

This object is achieved initially by tooling for making slots in a multistage disk by electrochemical machining, the tooling comprising at least a first ring and a second ring, each coaxial about an axis of the disk and configured to act as a cathode, each ring having an inside periphery with a plurality of radial machining projections, the first and second rings being rigidly secured to each other.

The term "rigidly secured to each other" is used to mean that the first and second rings are secured in such a manner that when the tooling moves, the first and second rings move simultaneously and in identical manner. The shape of the radial machining projections, when seen in axial view along the axis of the disk, corresponds to the shape of the slots that are to be made in the multistage disk. Furthermore, the inside diameter of the first ring is approximately equal to the outside diameter of the first stage of the disk, and the inside diameter of the second ring is approximately equal to the outside diameter of the second stage of the disk. Consequently, when the tooling moves along the axis of the multistage disk, the first ring acting as a cathode serves to make the slots in a first stage of the disk by electrochemical machining, and the second ring acting as a cathode serves to make the slots in a second stage of the disk by electrochemical machining.

The tooling makes it possible to machine the slots of each stage of the multistage disk by two successive or simultaneous sequences of electrochemical machining that are advantageously performed by means of the above-defined single piece of tooling.

In certain embodiments, the radial projections are mushroom-shaped when seen axially along the axis of the disk.

During machining, using the PECM method, an electrolyte is injected that flows along said mushroom-shaped projections; simultaneously, an electric current is caused to flow from an anode (specifically the multistage disk) to the cathode; the passage of this current strips metal atoms from the portion of the disk that is situated facing the cathode, such that, after machining, the slots in each stage of the multistage disk present the mushroom shape defined by the projections from the ring. Furthermore, the radial projections may be of mushroom shapes having dimensions that differ between the first and second rings. Furthermore, the radial projections are not limited to this shape, and their shapes may be different depending on the shape desired for the slots in each stage of the multistage disk, after machining.

In certain embodiments, the tooling further comprises a cover in which the rings are secured, said cover being arranged around the rings and being configured to prevent the electrolyte that runs around the projections from being projected radially.

The cover constitutes an outer shell of the tooling, enclosing the disk to be machined, the rings, and the electrolyte running along the rings. Furthermore, since the rings are secured to an inside periphery of the cover, when the cover moves, then the rings move simultaneously. Furthermore, the cover includes a plurality of passages to enable the electrolyte to be injected and to be discharged.

In certain embodiments, the cover includes at least two portions that are electrically insulated from each other by an insulator element, the first and second rings being secured to respective ones of the portions.

Because of this, the tooling makes it possible to machine the first and second stages of the disk with electrical parameters that are different, and generally not simultaneously. The insulator element is arranged in such a manner as to be interposed between the two cover portions and to be situated in a zone between the first ring and the second ring along the axis of the disk. In an implementation, while one of the rings is being used for machining, and is therefore electrically powered, the other ring is not electrically powered. Thus, unwanted machining of certain zones of the disk is avoided.

In certain embodiments, the tooling further includes at least two movable protectors secured to said cover, including fluid injection passages for injecting electrolyte onto the projections, said two movable protectors being adjacent to respective ones of said first and second rings.

The at least two movable protectors are generally secured to the inside periphery of the cover, and on their inside peripheries they possess respective pluralities of radial projections of shapes identical to the shapes of the first and second rings respectively. While the tooling is moving, the rings move in such a manner that one of them machines one stage of the disk and the insulating protector adjacent to said ring moves likewise, penetrating into the slot that has just been machined. The moving protector thus prevents electrolyte from being projected onto portions of the slot that have already been machined, consequently avoiding undesired machining of said slot portions.

The present disclosure also provides an assembly comprising: the tooling; the multistage disk; and at least one stationary protector configured to be secured on the disk and to protect the disk from the electrolyte.

The stationary protector is a nonconductive element serving to protect the disk from the electrolyte, avoiding unwanted machining of surfaces adjacent to the stages of the disk that are to be machined. The stationary protector can also serve to discharge the electrolyte together with the dissolved matter after machining by directing the electrolyte towards the discharge passages of the cover.

The present disclosure also provides a machine for electrochemical machining comprising: a support enabling a multistage disk to be secured thereto; the tooling; an actuator capable of imparting relative movements between the tooling and the disk secured to the support, the disk being at least in part inside the tooling; an electrolyte circuit; and an electrical circuit; the machine being configured to enable a first stage of the disk to be machined using the first ring, and a second stage of the disk to be machined using the second ring, by electrochemical machining, during said movements.

The present disclosure also provides a method of making slots in a multistage disk by electrochemical machining using the tooling, the method comprising the following steps:

a) positioning the tooling in such a manner that a first of said at least two disks is in the vicinity of the first stage of the disk that is to be machined;

b) machining the first stage of the disk by electrochemical machining by moving the tooling relative to the disk along the axis of the disk;

c) positioning the tooling in such a manner that a second of said at least two disks is in the vicinity of the second stage of the disk that is to be machined; and d) machining the second stage of the disk by electrochemical machining by moving the tooling relative to the disk along the axis of the disk.

This method enables all of the steps to be performed without any need to change tool. This leads to a saving of time during fabrication.

In certain implementations, the method further comprises the following steps:
disconnecting the supplies of electricity and electrolyte to the second ring while the first ring is being machined during step b); and
disconnecting the supplies of electricity and electrolyte to the first ring while the second ring is being machined during step d).

These steps make it possible to avoid unwanted machining of certain zones of the disk while one of the rings is being machined.

In certain implementations, during machining step b) and/or d), the movement of the tooling relative to the disk is helical movement about the axis of the disk.

BRIEF DESCRIPTION OF THE DRAWINGS

The invention and its advantages can be better understood on reading the following detailed description of various embodiments of the invention given as nonlimiting examples. The description makes reference to the accompanying sheets of figures, in which.

DETAILED DESCRIPTION OF EMBODIMENTS

Figure 1:
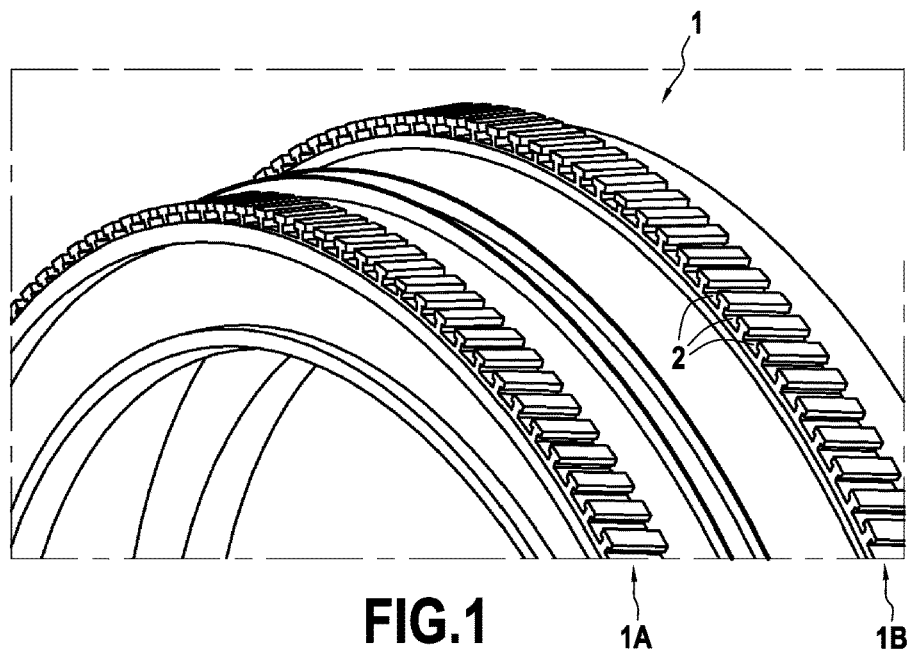
FIG. 1 is a fragmentary perspective view of a multistage disk.

FIG. 1 shows a perspective view of a multistage disk after machining, including in this example a smaller-diameter stage 1A and a larger-diameter stage 1B, each stage presenting a plurality of slots 2. Given the structure of a disk of this type, it can be understood that it is difficult to make the slots in one stage without damaging the other stage when using the usual techniques (broaching, milling).

Figure 2A:
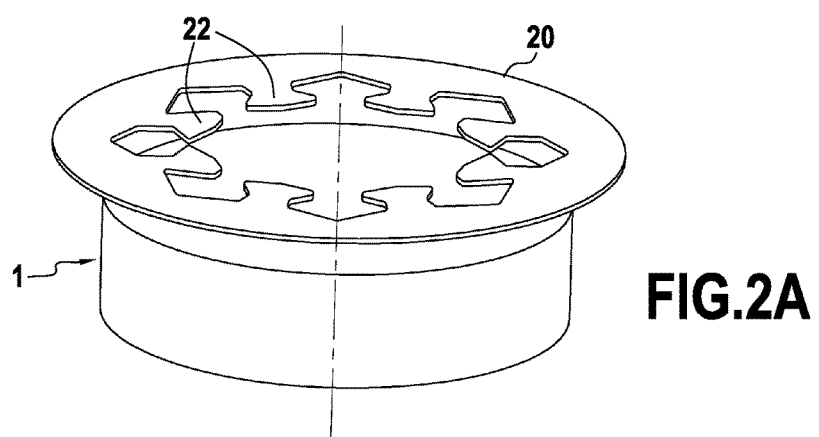
FIGS. 2A and 2B are simplified representations of a disk, respectively before machining the slots (FIG. 2A) and after machining the slots (FIG. 2B)
Figure 2B:
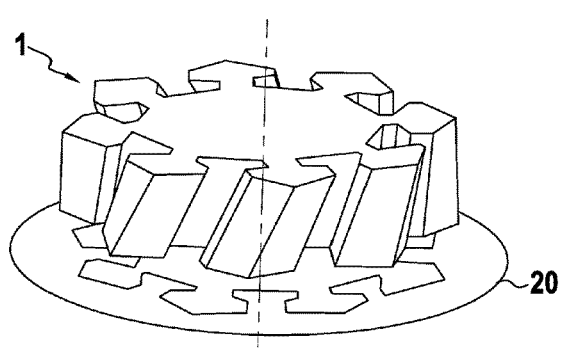

FIGS. 2A and 2B are simplified representations of one stage of a disk 1 before machining the slots 2 (FIG. 2A), and after machining the slots 2 (FIG. 2B), by a known electrochemical method using pulsed electrical chemical machining (PECM). The ring 20, acting as a cathode, passes a pulsed electric current, and an electrolyte under pressure flows between the ring 20 and the disk 1 for machining. Initially, the ring 20 is in a high position, i.e. at the top of the disk 1 (FIG. 2A). Thereafter, the ring 20 is moved in translation towards the disk 1 along its axis, following a helical path relative thereto. When the ring is level with the disk, successive current pulses are triggered in the electrolyte. With the ring 20 acting as a cathode and the disk 1 acting as an anode, ionic dissolution takes place. After machining, the ring 20 is in a low position, i.e. below the disk 1 (FIG. 2B).

Figure 3:
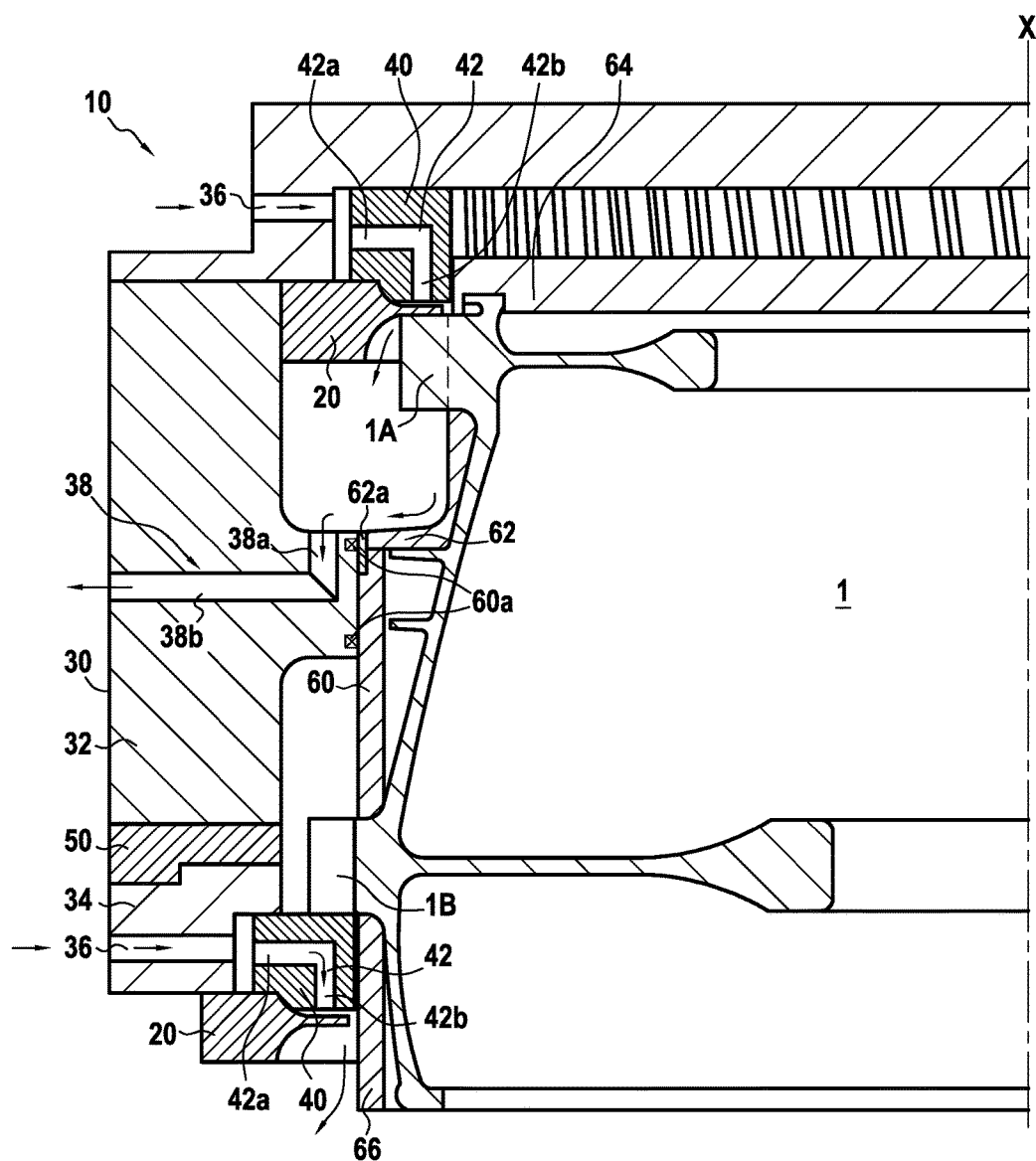
FIG. 3 is a section view of the tooling for making slots in a multistage disk.

Machining on this principle is used by tooling 10 in accordance with the invention, as shown in FIG. 3. This tooling serves to machine in succession the larger-diameter stage 1B of the disk 1, followed by the smaller-diameter stage 1A of the disk 1. FIG. 3 shows one half of the tooling 10 in section view, which tooling is arranged in axisymmetric manner around the axis of the rings (axis X). The rings 20 and the disk 1 are also arranged in axisymmetric manner around the same axis X. The tooling 10 is shown arranged around the disk 1, and configured to be capable of moving relative thereto, along the axis X.

The tooling 10 includes in particular a cover 30, which is also arranged in axisymmetric manner around the axis X, and which surrounds the disk 1. A first ring 20 and a second ring 20 are secured to an inside periphery of the cover 30. Consequently, while the tooling is moving, the movement of the cover 30 causes both rings 20 to be moved simultaneously. The first ring serves to machine the first stage 1A of the disk 1, and the second ring serves to machine the second stage 1B of the disk 1.

Around its entire periphery, the cover 30 has a plurality of injection passages 36 whereby the tooling is supplied with electrolyte, and a plurality of discharge passages 38 through which the electrolyte is discharged. Each discharge passage 38 comprises at least one groove 38a and a discharge hole 38b. The groove 38a is arranged in a direction parallel to the axis X of the tooling, and the discharge hole 38b is arranged in a radial direction that is perpendicular to the axis X. The flow of the electrolyte is represented by arrows in FIG. 3. The cover 30 comprises a first portion 32 and a second portion 34. The portions 32 and 34 are electrically insulated from each other by an insulator element 50 of annular shape that is interposed between said portions 32 and 34. Since the first ring is secured to the first cover portion 32 and the second ring is secured to the second cover portion 34, the two rings are consequently electrically insulated from each other by the insulator element 50. Thus, while one of the two rings is being machined, and is thus electrically powered, the other ring need not be electrically powered, thereby avoiding unwanted machining in certain zones of the disk 1.

Figures 4, 5:
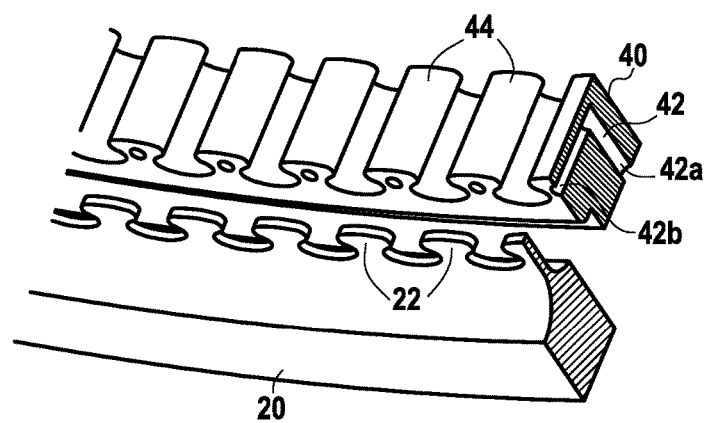
FIG. 4 shows in greater detail, a portion of a ring and of an insulating protector.
FIG. 5 shows diagrammatically the machine for electrochemical machining.

The tooling 10 also has two movable protectors 40, likewise secured to the inside periphery of the cover 30. Consequently, while the tooling is moving, the movement of the cover 30 causes both movable protectors 40 to be moved simultaneously. As shown in FIG. 4, the protectors are identical in shape to the rings 20 when seen in a view along the axis X of the tooling, i.e. they are annular in shape, and they possess a plurality of radial protector projections 44 on their inside peripheries. The movable protectors 40 are adjacent to respective ones of the rings 20, and they are situated above them, along the axis X of the tooling. While the tooling is moving, the movable protectors and the rings move simultaneously as a single unit. Thus, the assembly constituted by the rings 20 and the movable protectors 40 forms an annular part having a plurality of radial projections on its inside periphery. These radial projections have the shape and the dimensions of the slots that are to be machined in each stage of the disk 1.

Furthermore, the movable protectors 40 have a plurality of fluid injection passages 42, each having a radial passage portion 42a and an axial passage portion 42b in communication with each other. The radial passage portion 42a is arranged in a direction perpendicular to the axis X of the tooling, and the axial passage portion 42b is arranged in a direction parallel to the axis X. The fluid injection passages 42 are arranged in such a manner as to supply fluid to each radial protector projection 44, each axial passage portion 42b being arranged in such a manner as to open out onto each projection 32 of the rings 20, which rings are respectively adjacent to the radial projections 44 of the movable protectors 40, as can be seen in FIG. 4. The radial passage portions 42a are arranged in such a manner as to open out respectively in the injection passages 36 of the cover 30. Consequently, while a ring is being used for machining, it is supplied with electrolyte from the injection passages 36 of the cover 30 and via the fluid injection passages 42. The electrolyte can then run around the projections 22 of the ring, prior to being discharged. Also, while a ring that is being machined moves along the axis X, the insulating protector 40 that is adjacent thereto moves simultaneously, penetrating into the slots that have just been machined in the disk 1. Thus, the insulating protector 40 serves to protect the slot portions that have just been machined by preventing the electrolyte from running over these portions, thus avoiding excessive machining of these portions, and consequently preserving the quality of the machining of the slots.

A stationary protector 60 is also arranged on the outside periphery of the disk 1, between the two stages of the disk 1. The protector 60 forms an annular part around the disk 1. It may be made up of two portions that are secured together after they have been put into position on the disk, so as to facilitate installation and securing around the outside periphery of the disk 1. The securing means of these two portions may be a lever latch or a clamping ring or any other equivalent means. The protector 60, which may be electrically insulating, serves to protect the zones of the disk 1 that are not to be machined, by preventing the electrolyte from running over these zones. Furthermore, the stationary protector 60 may include a projection 62 serving to direct the electrolyte towards a discharge passage 38 of the cover 30, thereby facilitating discharge of the electrolyte together with dissolved material. A clamping ring 62a serves to position and hold the elements 60 and 62 together. Sealing gaskets 60a are also arranged around the protector 60, so as to provide sealing at the contact between the cover 30 and the protector 60. The assembly made up of the tooling 10, of the multistage disk 1, and of the stationary protector 60 may also include both a top stationary protector 64 that protects a top portion of the disk 1, being situated above and secured to the smaller-diameter stage 1A, and also a bottom stationary protector 66 that protects a bottom portion of the disk 1, being situated below the larger-diameter stage 1B, and being secured around the disk 1, in the same manner as the protector 60. By preventing the electrolyte from running over zones of the disk 1 that are not to be machined, these various stationary protectors serve to protect those zones.

FIG. 5 shows a machine 100 for electrochemical machining that includes an actuator 110 capable of moving the tooling 10 axially along an axis X of the tooling relative to the multistage disk, which actuator may be a vertical axis actuator.

An electrolyte circuit 120, possessing a tank 122, serves to supply the rings 20 with electrolyte via a supply circuit 121, and to discharge the electrolyte via a discharge circuit 125.

In particular, the circuit 120 has a selector valve 124 that can change between a first position in which the first ring only is supplied with electrolyte, and a second position in which the second ring only is supplied with electrolyte.

Thereafter, in the supply circuit 121, the electrolyte is pumped from the tank 122 by a pump 123; it is then directed by the selector valve 124 either towards the injection passages 36 of the top protector 40 or else towards the passages of the bottom protector 40, depending on whether it is desired to machine the top stage 1A or the bottom stage 1B.

Electrolyte then flows through the fluid injection passages 42 of the protector 40 in use, and then runs over the projections 22 of the ring 20 and the stage of the disk that is to be machined (the stage 1A or 1B depending on circumstances), thereby enabling that stage to be machined progressively.

Finally, the electrolyte is discharged via a discharge passage 38 of the cover (while machining the stage 1A), or via a bottom zone of the tooling 10 situated under the larger-diameter stage 1B (while machining the stage 1B) (discharge circuit 125).

An electric circuit 130 also serves to supply electrical power to the rings 20 electrically. The circuit 130 includes an electric switch 132 that can change between a first position in which the first ring only is electrically powered by a source 135, and a second position in which the second ring only is electrically powered.

Thus, the machine 100 is configured to enable the first stage 1A of the disk 1 to be machined using the first ring, and the second stage 1B to be machined using the second ring.

The disk is machined as follows.

The disk 1 is initially put into place on a support 140 constituted by a turntable, enabling the disk to be turned about the axis X. Thus, while the tooling 10 is moved in translation along the axis X during machining by the actuator 110, it follows a helical path relative to the disk 1, thereby making it possible to obtain the desired shape for the slots.

Initially, the tooling 10 is positioned in such a manner that the second ring is in the vicinity of the larger-diameter stage 1B of the disk that is to be machined. To do this, the second ring is placed at a distance of 0.01 millimeters (mm) to 0.2 mm above the top surface of the stage 1B, along the axis X.

The stage 1B is then machined by causing the following actions to take place simultaneously: The machine 100 moves the tooling 10 along the axis X by means of the actuator 110; the disk 1 is turned by the turntable 140; and the second ring is supplied with electrolyte and electrical power. These combined actions cause the stage 1B to be machined electrochemically. During this machining operation, the first ring is not supplied with electrolyte and it is not supplied with electrical power. The machining of the slots of the stage 1B is terminated once the second ring has been moved below the bottom surface of the stage 1B along the axis X. The second ring is then no longer supplied with electrolyte and it is no longer supplied with electrical power.

Thereafter, the tooling 10 is positioned in such a manner that the first ring is in the vicinity of the stage 1A. To do this, the first ring is placed at a distance of 0.01 mm to 0.2 mm above the top surface of the first stage 1A, along the axis X.

As during the first stage of machining, the machine 100 then moves the tooling 10 along the axis X by means of the actuator 110, the first ring simultaneously being supplied with electrolyte and with electrical power, such that the stage 1A can be machined electrochemically. While the stage 1A is being machined by the first ring, the second ring is not supplied with electrolyte and it is not supplied with electrical power. The machining of the slots of the stage 1A is terminated once the first ring has been moved below a bottom surface of the stage 1A along the axis X. The first ring is then no longer supplied with electrolyte and it is no longer supplied with electrical power. The machining of the stages of the multistage disk 1 is thus terminated.

Although the present invention is described with reference to specific embodiments, it is clear that modifications and changes may be made to those embodiments without going beyond the general scope of the invention as defined by the claims. In particular, individual characteristics of the various embodiments shown and/or mentioned may be combined in additional embodiments. Consequently, the description and the drawings should be considered as being illustrative rather than restrictive.

It is also clear that all of the characteristics described with reference to a method can be transposed, singly or in combination, to tooling, and vice versa, all of the characteristics described with reference to tooling can be transposed, singly or in combination, to a method.

The invention claimed is:

1. Tooling for making slots in a multistage disk by electrochemical machining, wherein the tooling comprises at least a first ring and a second ring, each arranged coaxially about an axis of the disk, and configured to act as a cathode for machining a respective one of two stages of different diameters of the disk, each ring having an inside periphery with a plurality of radial machining projections, the first and second rings being rigidly secured to each other.

2. Tooling for making slots in a multistage disk by electrochemical machining according to claim 1, wherein the radial projections are mushroom-shaped when seen axially along the axis of the disk.

3. Tooling for making slots in a multistage disk by electrochemical machining according to claim 1, further comprising a cover in which the rings are secured, said cover being arranged around the rings and being configured to prevent the electrolyte that runs around the projections from being projected radially.

4. Tooling for making slots in a multistage disk by electrochemical machining according to claim 3, wherein the cover includes at least two portions that are electrically insulated from each other by an insulator element, the first and second rings being secured to respective ones of the portions.

5. Tooling for making slots in a multistage disk by electrochemical machining according to claim 3, further including at least two movable protectors secured to said cover, including fluid injection passages for injecting electrolyte onto the projections, said two movable protectors being adjacent to respective ones of said first and second rings.

6. An assembly comprising: the tooling according to claim 1; the multistage disk; and at least one stationary protector configured to be secured on the disk and to protect the disk from the electrolyte.

7. A machine for electrochemical machining comprising: a support enabling a multistage disk to be secured thereto; the tooling according to claim 1; an actuator capable of imparting relative movements between the tooling and the disk secured to on the support-, the disk being at least in part inside the tooling; an electrolyte circuit; and an electrical circuit; the machine being configured to enable a first stage of the disk to be machined using the first ring, and a second stage of the disk to be machined using the second ring, by electrochemical machining, during said movements.

8. A method of making slots in a multistage disk by electrochemical machining using the tooling according to claim 1, the method comprising the following steps:
   a) positioning the tooling in such a manner that a first of said at least two disks is in the vicinity of the first stage of the disk that is to be machined;
   b) machining the first stage of the disk by electrochemical machining by moving the tooling relative to the disk along the axis of the disk;
   c) positioning the tooling in such a manner that a second of said at least two disks is in the vicinity of the second stage of the disk that is to be machined; and
   d) machining the second stage of the disk by electrochemical machining by moving the tooling relative to the disk along the axis of the disk.

9. A method of making slots in a multistage disk by electrochemical machining according to claim 8, the method further comprising the following steps:
   disconnecting the supplies of electricity and electrolyte to the second ring while the first ring is being machined during step b); and
   disconnecting the supplies of electricity and electrolyte to the first ring while the second ring is being machined during step d).

10. A method of making slots in a multistage disk by electrochemical machining according to claim 8, wherein during machining step b) and/or d), the movement of the tooling relative to the disk is helical movement about the axis of the disk.

* * * * *